United States Patent Office 3,488,631
Patented Jan. 6, 1970

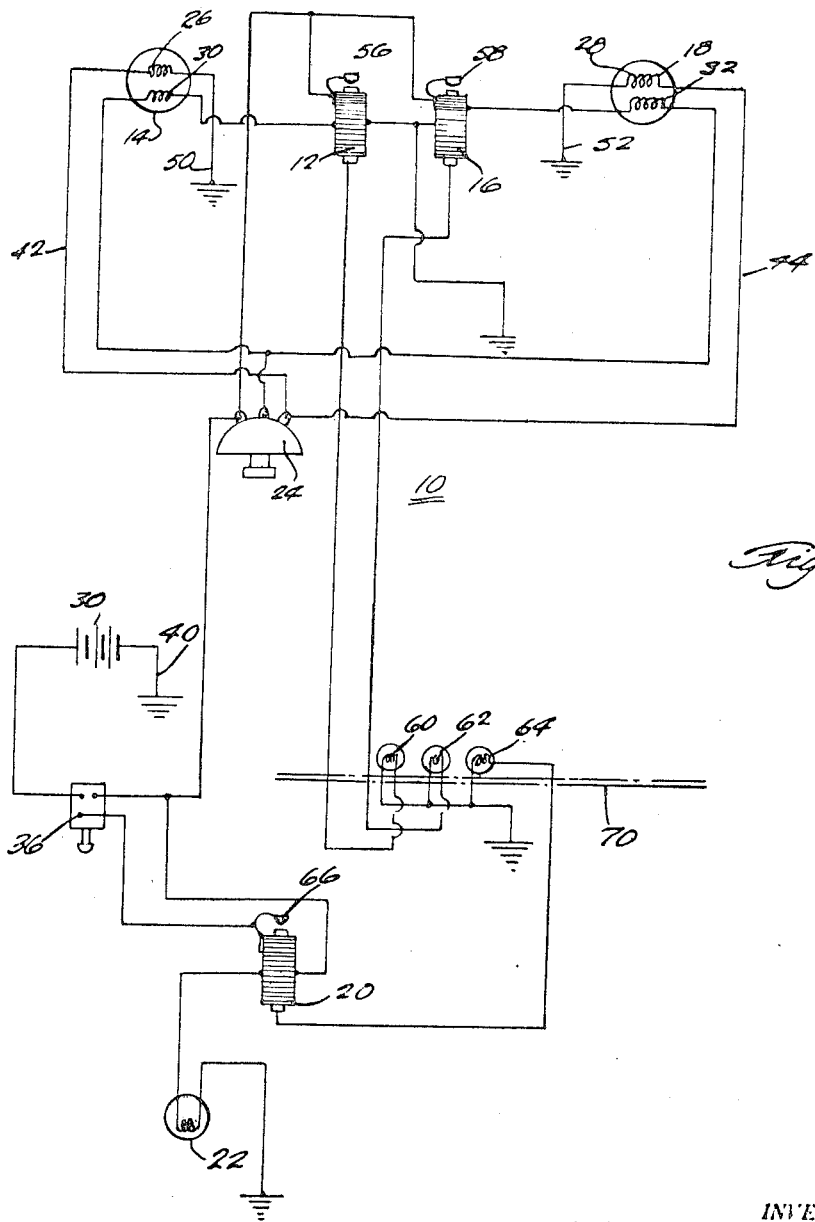

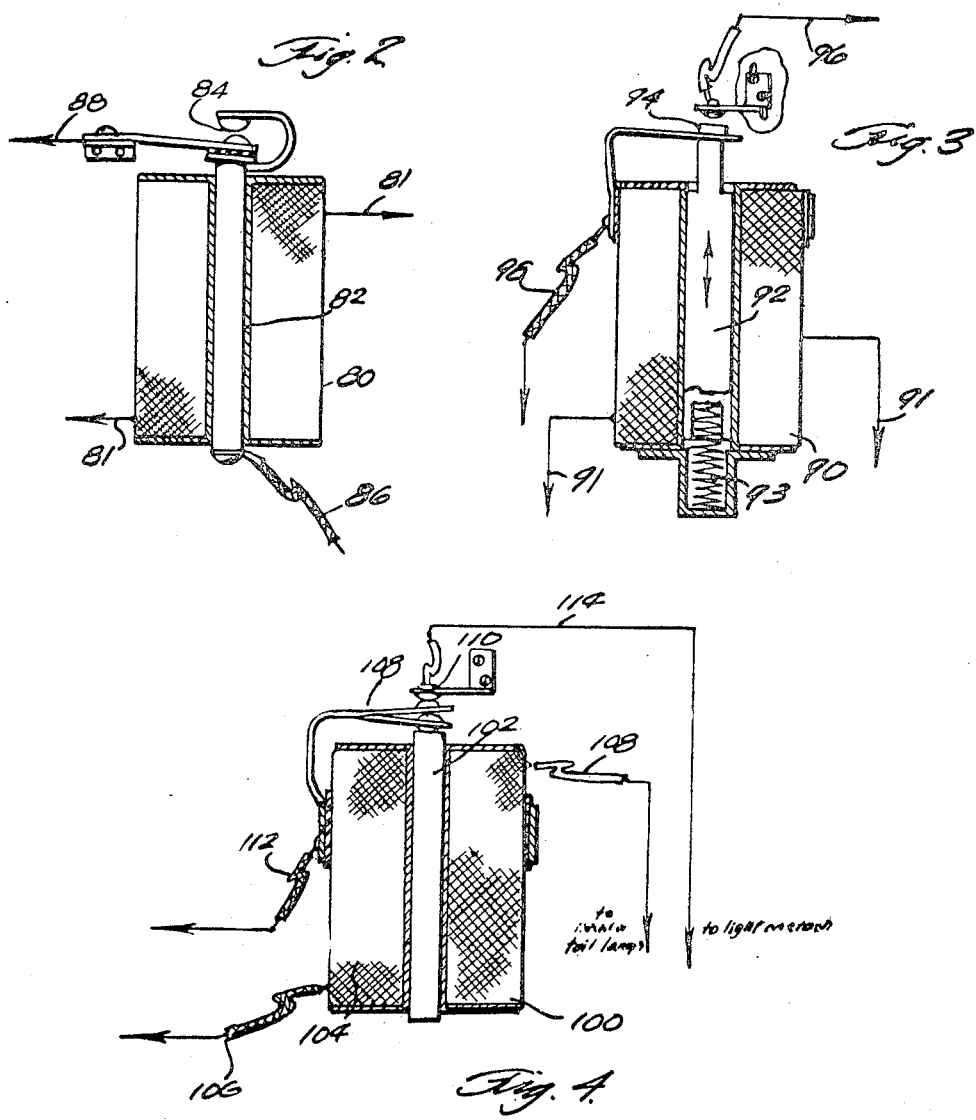

3,488,631
SIGNAL SYSTEM FOR FAULTY HEADLIGHTS
Wilmoth E. Williams, 4301 Roosevelt,
Midland, Tex. 79701
Filed Aug. 25, 1966, Ser. No. 574,983
Int. Cl. H01k 7/04
U.S. Cl. 340—80                                                 1 Claim

ABSTRACT OF THE DISCLOSURE

A signal system for indicating the failure of a headlight or the like comprising a circuit through each light including a solenoid and a supplemental circuit closed by de-energization of the solenoid, which in turn is occasioned by failure of the main light, to energize an indicator light on the dashboard.

---

This invention relates to a new and improved signal system for indication of faulty headlights on a dashboard, and more particularly, the invention is related to a signaling system using solenoids or relays for indicating one of any of faulty headlights or tail lights, or other light circuits on an automobile.

It is an object of the present invention, in accordance with the present disclosure, to provide a signal system for faulty headlights and the like, and more particularly, it is an object to provide a signal system that is completely automatic and indicative of a failure of a light, the light failure causing a switch to actuate another light circuit to provide indication to the operator of such vehicle.

It is a further object of the present invention to provide a simple construction for a signal system, in which there is a magnetic coil or relay without requiring a group of magnetic coils or a system of such devices in order to enable the system to operate.

A further object of the present invention is to provide a quite simple signal system for faulty headlight indication that requires very little maintenance if any.

A further object of the present invention is to provide a signal safety system requiring less wiring, less devices, and a small number of magnetic coils installed in any of the light wiring systems of an automobile vehicle, so that the failure of one circuit of a light system may be indicated without causing further failures thereof.

The above and other objects and advantages of the present invention will become apparent upon full consideration of the following detailed description and accompanying drawings in which:

FIGURE 1 is a schematic circuit's diagram of the signal system for indication of the identity of a faulty one of a series of headlights or the like, according to the preferred embodiment of the present invention;

FIGURE 2 shows a detailed construction of the solenoid of the invention according to one embodiment thereof;

FIGURE 3 shows the detailed construction of the holding relay in accordance with another embodiment of the present invention; and FIGURE 4 shows a further embodiment of the holding relay or solenoid in the protective circuit system showing a further embodiment of the details thereof.

Referring now to the drawings there is shown a signal system 10 for the indication of the identity or identification of faulty ones of a series of headlights, or tail lights, or other lights, including a holding relay 12 for a left headlamp 14, and a holding relay 16 for a right headlamp 18, as well as a further holding relay means 20 for one or more tail lights 22, all adapted to be mounted in the conventional way as lights for their respective functions in the lighting circuit of a conventional automotive vehicle.

Also shown in FIGURE 1 are the high and low filament circuits for the headlights 14, 18, the high beam circuit being connected through the foot switch 24 to the filaments 26, 28, and the low beam filaments 30, 32 being provided for energization through the adjacent terminal foot switch 24 and the dashboard mounted light switch 36 which in turn is connected to the battery or current source 38, which is connected in turn to a ground reference potential shown as ground 40, in the usual manner.

The high beam filaments are connected by conductor lines 42, 44 to the foot switch 24. The high beam circuit is completed to ground at points 50, 52, respectively.

It is seen that the light switch 36 when it energizes the light circuits through switch 24 provides for, in a preferred embodiment as shown, the energization of the holding relays 12, 16 in a way so that the switch 56, 58, respectively are maintained open until failure of the filament circuit 30, 32, alternatively, of the lamps 14, 18, so that upon failure of one filament thereof, or both thereof, corresponding holding relays 12, 16 are then actuated and energized to close respectively switches 56 or 58, or both of them in the case where both filaments 30, 32 have become faulty.

Upon closure of the switch elements 56, 58, then the indicator lamps 60, 62 become energized respectively upon the faulty characteristic of either of lamps 14, 18, respectively, so that lamp 60 is energized upon the default of lamp 14, and lamp 62 becomes energized for the default of lamp 18. Similarly, an energization of the holding coil means 20 energizes lamp 64 mounted on the dashboard with lamps 60, 62 upon the default characteristic of tail light 22 becoming evident to the signaling system 10. In more detail, it is seen that closure of the light switch 36 effects a state of energization of the holding relay means 20 until the tail light 22 becomes defective, at which time the holding relay means 20 actuates the closure of switch 66 so that tail light 22 no longer draws any current and the indicator light 64 on the dash or dashboard 70 becomes energized upon the closure of said switch 66.

In further and other embodiments of the invention, it is seen that the holding means or holding relay means 80 of FIGURE 2 is similarly constructed so that energization of the holding relay means 80 is effected by the current drawn in the headlamp or tail lamp system to which it may be connected until the failure thereof, at which time the core element 82 is seen to actuate closure of the switch 84 to provide energization of the indicator lamp that may be connected to conductors 86, 88 thereof. The conductors 81, 81, of the holding relay means 80 are connected in circuit relation with the headlamp as above described.

FIGURE 3 shows a comparable and corresponding type of holding relay means 90 energized by connection of conductors 91, 91. Energization of the holding relay means 90 provides for depression of the core means 92 downward against the spring 93 so that the switch contacts 94 remain open. Upon the fault occurring in the respective headlamp that is associated with the circuit connection of conductors 91, 91, the holding relay means 90 therefore becomes deenergized so that the spring 93 effectuates an upward movement of core member 92 for accomplishing a closed state or condition of the switch 94 so that an indicator light or lamp that is connected to terminals 96, 98 of the switch 94 becomes energized thereby. This is used in conjunction as an alternative arrangement to the holding means of FIGURE 1.

It is further seen that FIGURE 4 provides an embodiment also within the purview of the invention which includes a solenoid or armature member 102 that is actuable upon energization of the coil 104 upon conductors 106, 108 being connected in the light switch-headlamp or tail lamp circuit to which it appertains. Upon failure of the filament of the headlamp in circuits 106, 108, then the member 102 is displaced along the direction of the arrow 108 upwardly until it contacts element 110 for closure of a circuit including conductor 112 connected to the light switch and conductor 114 connected to the indicator light on the dashboard (not shown).

It is seen that the circuit breaker or switch control system including the holding relay means of the present invention may be installed in any light circuit of an automotive vehicle so that the simplicity and effectiveness of the signal system for faulty headlights of the present invention may be practiced and utilized within the objects and advantages hereof.

What is claimed is:

1. A signal system for indication of the identity of a faulty one of a series of headlights or the like comprising a headlight system having several lights connected by a first switch for being energized from a vehicle battery, an indicator light connected between a reference potential to a holding relay and thence through a second switch to a point in the high potential side of the headlight system, said relay being separately energized by current from said high potential side responsive to the closed condition of the first switch in the headlight circuit for holding the second switch open, and said relay being deenergized upon failure of a lamp of said headlight system to cause said second switch to close for energizing the indicator light from said point of the high potential side of the headlight system, said second switch including a resilient arm electrically connected to said indicator light having contact points on each side thereof insulated from each other and a reverted support secured to the relay core and having a contact button normally engaged by said arm, energization of said relay moving said arm to a position closing a circuit through said arm and the relay core to said indicator light.

References Cited

UNITED STATES PATENTS 2,105,756   1/1938   Rohmer _____ 340—251

ALVIN H. WARING, Primary Examiner

U.S. Cl. X.R.

315—82; 340—251